INVENTORS
JAMES WALLEN, JR
& RICHARD H. HRONIK

BY *Hurwitz, Rose & Greene*
ATTORNEYS

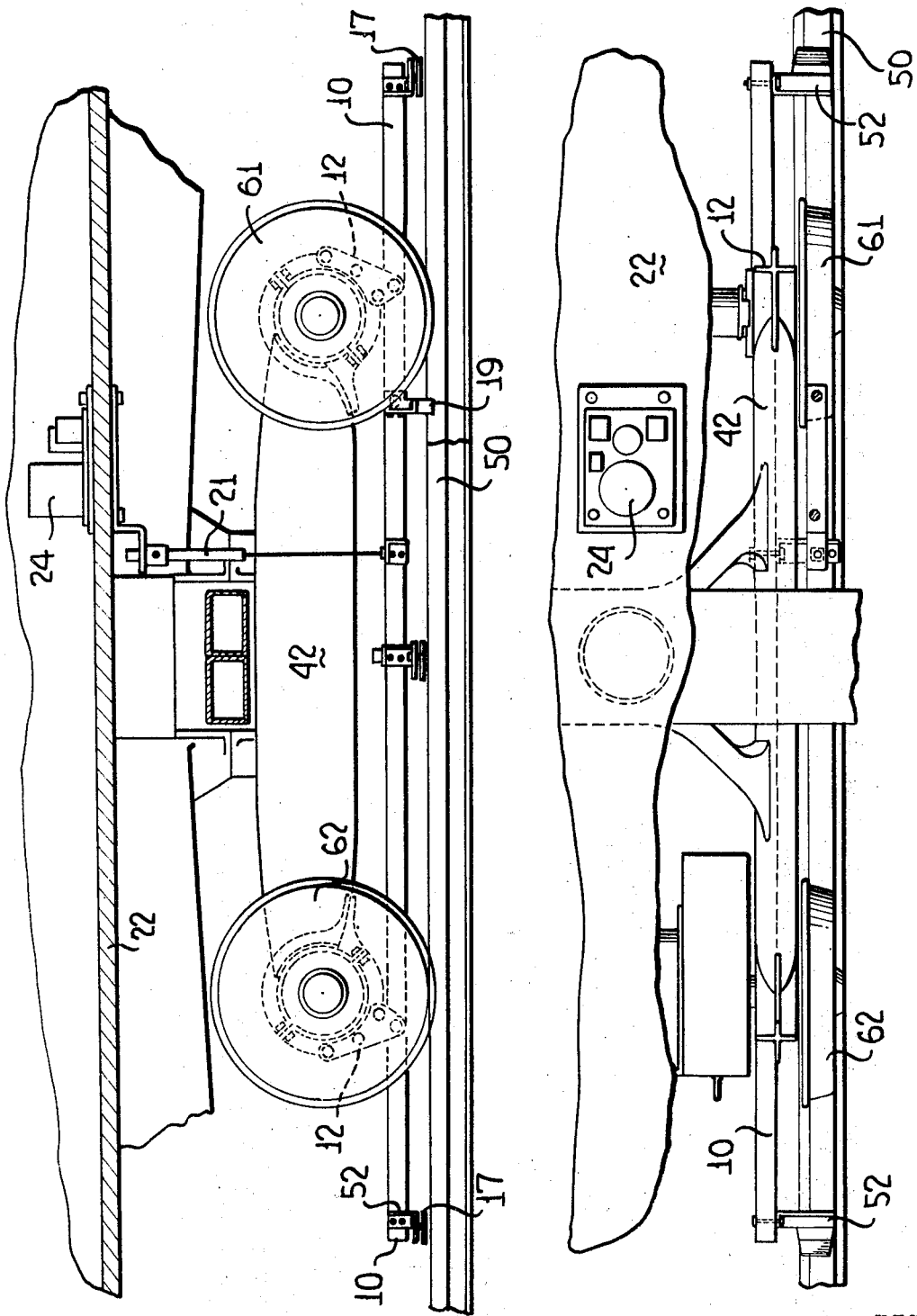

June 23, 1970    J. WALLEN, JR., ET AL    3,517,307
TRACK PROFILE AND GAUGE MEASURING SYSTEM
Filed Sept. 12, 1967    4 Sheets-Sheet 4

INVENTORS
JAMES WALLEN, JR.
& RICHARD H. HRONIK

BY *Hurwitz, Rose & Greene*

ATTORNEYS

United States Patent Office 3,517,307
Patented June 23, 1970

3,517,307
TRACK PROFILE AND GAUGE MEASURING SYSTEM
James Wallen, Jr., Annandale, and Richard H. Hronik, Falls Church, Va., assignors to Melpar, Inc., Falls Church, Va., a corporation of Delaware
Filed Sept. 12, 1967, Ser. No. 667,173
Int. Cl. G01r *27/26;* G01n *27/22*
U.S. Cl. 324—61
12 Claims

ABSTRACT OF THE DISCLOSURE

Instrumentation mounted aboard (i.e., on or about, or both) a railway car or the running gear or undercarriage thereof, and adapted for high speed survey measurements of track profile, i.e., vertical curvature or elevation, alignment, i.e., lateral curvature, and other railway track and rail parameters, by means of sensors having an electrical parameter that varies according to proximity to the rails of the track without contacting the rails. Such sensing is accomplished using capacitive probes mounted on the train for movement closely adjacent the rails.

BACKGROUND OF THE INVENTION

The present invention relates generally to apparatus for detecting and surveying the character of a roadbed including the surface on which vehicular traffic passes, such as railway tracks or specially implemented roadways, with respect to factors such as vertical curvature and lateral curvature, both static and dynamic. More particularly, the invention relates to such apparatus wherein measurements for determining the aforementioned factors are made using non-contacting rail proximity sensors.

In the past a variety of types of apparatus have been proposed for use in determining the profile, alignment, cross-level, track gauge, and other parameters or characteristics of a railway track, whereby to provide information to a central authority, such as a traffic safety group, for determining points at which rail conditions or track conditions are faulty and require correction, and/or for ascertaining the quality of the ride to be expected by the passengers on the train. For example, in U.S. Pat. No. 3,038,322 issued June 12, 1962 to Grossmann there is disclosed a railway track test vehicle for providing a track profile measurement, in which the vehicle produces a pair of loaded points on the track as a result of forces exerted at the points of contact between its wheels and the rail. A substantially unloaded point is said by the patentee to exist at a point of contact between the rail and a wheel of a lightweight truck pushed ahead of the test vehicle. A pivoted lever on the truck operates in conjunction with a cable and recorder to record vertical displacements of a member at a point which corresponds to the unloaded point, relative to the floor of the test vehicle, the latter following the motion of the loaded points.

Another type of apparatus is disclosed in U.S. Pat. No. 2,978,904 issued Apr. 11, 1961 to Bereznai. Again a special measuring carriage or truck is employed, but the truck is coupled beneath the railway vehicle or car for free running movement along the rails and in contact therewith. Special cable transmission devices constituting a wholly mechanical system are coupled to rail-contacting detectors to effect and record measurements pertaining to track gauge, superelevation, static and dynamic variations in cross-level of the track, and alignment of the rails.

Still other types of apparatus for obtaining pertinent track data by which to effect correlation or improvement of track conditions are disclosed in U.S. Pats. 1,778,287; 1,837,633; and 2,136,913. It is a characteristic of each of these prior art systems and/or proposals, and others of which we are aware, that the detector employed for making the survey and for initiating the measurements associated with the survey, such as variations in the track surface, both vertical and horizontal, and in rail gauge and the like, is necessarily continuously disposed in physical contact with a rail or rails of the track. In such arrangements, the railway car or other test vehicle must move sufficiently slow that the detector or part thereof in contact with the rail is not subjected to impacts, shocks, jarring or vibrations of a nature and extent that would render the detected information unreliable, and certainly not of a degree that could result in destruction of the rail-contacting part.

With the continuing emphasis on high speed mass transit systems in general, and the advent of the high speed railway train, in particular, it is essential that newly constructed, as well as used, tracks be thoroughly surveyed to determine their static and dynamic profile and alignment, among other parameters, and their capabilities of permitting train speeds in excess of one hundred miles per hour and possibly 150 m.p.h. or more.

Where the detector or a portion thereof is in actual physical contact with the rail itself, travel of the test vehicle at or approaching speeds such as those mentioned above will subject the entire test apparatus to severe jolts and vibrations and ultimately to severe damage when even a slight defect in the track is encountered. For example, very slight differences in elevation between rail sections at their juncture can cause impacts or set up vibrations which rapidly result in breakdown of all or portions of the test equipment.

Accordingly, it is a principal object of the present invention to provide an improved system of instrumentation and apparatus for high speed surveying and measuring of railway track characteristics, for evaluation of capabilities of the track to support high speed travel.

SUMMARY OF THE INVENTION

Briefly, according to the present invention surveying of railway tracks at high speeds to obtain measurements relating to track profile, alignment, and gauge, is accomplished using apparatus comprising a plurality of proximity sensing devices mounted at intervals along a beam or beams attached to the car or undercarriage thereof adjacent a rail or rails in normally spaced apart, non-contacting relationship therewith. In a preferred embodiment, the proximity sensing devices are probes in the form of plate-like conductive members which form, with the respective rail, the electrodes of capacitors separated at intervals along the beam, the latter of sufficient length to permit an indication of curvature, both vertical and lateral (or horizontal), along a substantial length of track compared with the normal distance between electrodes of each capacitor.

As the spacing between individual probe and its associated rail varies, the electrical capacitance between those two "electrodes" or "plates" also varies, in the well known inverse relationship with distance, and these variations in capacitance can be measured directly or indirectly to provide the desired information charted along the track. Also in accordance with the preferred embodiment, the measurement of capacitance is achieved in an indirect manner, the capacitor in question being employed in the feedback path of an operational amplifier whose output signal magnitude varies according to the amount of feedback, the latter directly dependent upon the instantaneous value of capacitance between probe and rail. The magnitude and polarity of the amplifier output signal, relative to a predetermined reference level, are detected and used to assemble or determine the desired information. A direct readout of the various track parameters (e.g., profile and alignment) may be provided, or as is preferred, the signal data obtained from each amplifier-detector channel may be sampled and recorded along with charting information, such as speed of train and mileage from originating point, by which to subsequently plot the desired parameters.

While a capacitive probe arrangement is employed for the proximity sensing devices, other devices such as inductive probes, may be alternatively employed in non-contacting relationship with the rails for a similar purpose.

It is, therefore, another object of our invention to provide track profile, alignment and gauge measuring apparatus for use on high speed test vehicles, wherein the apparatus includes rail proximity sensing devices in non-contacting relationship with the rails.

It is a more specific object of our invention to provide apparatus according to the immediately preceding objective, wherein the proximity sensing devices are in the form of capacitive probes mounted at separated intervals along a beam in spaced apart relationship with a rail of the track.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 4 is a fragmentary side view of the test car undercarriage with sufficient detail to show the attachment of the mounting beam and proximity sensors;

FIG. 5 is a fragmentary top view of that portion of the apparatus shown in FIG. 4, with the floor of the car partially broken away for the sake of clarity;

DESCRIPTION OF THE PREFERRED EMBODIMENT

Figure 1:
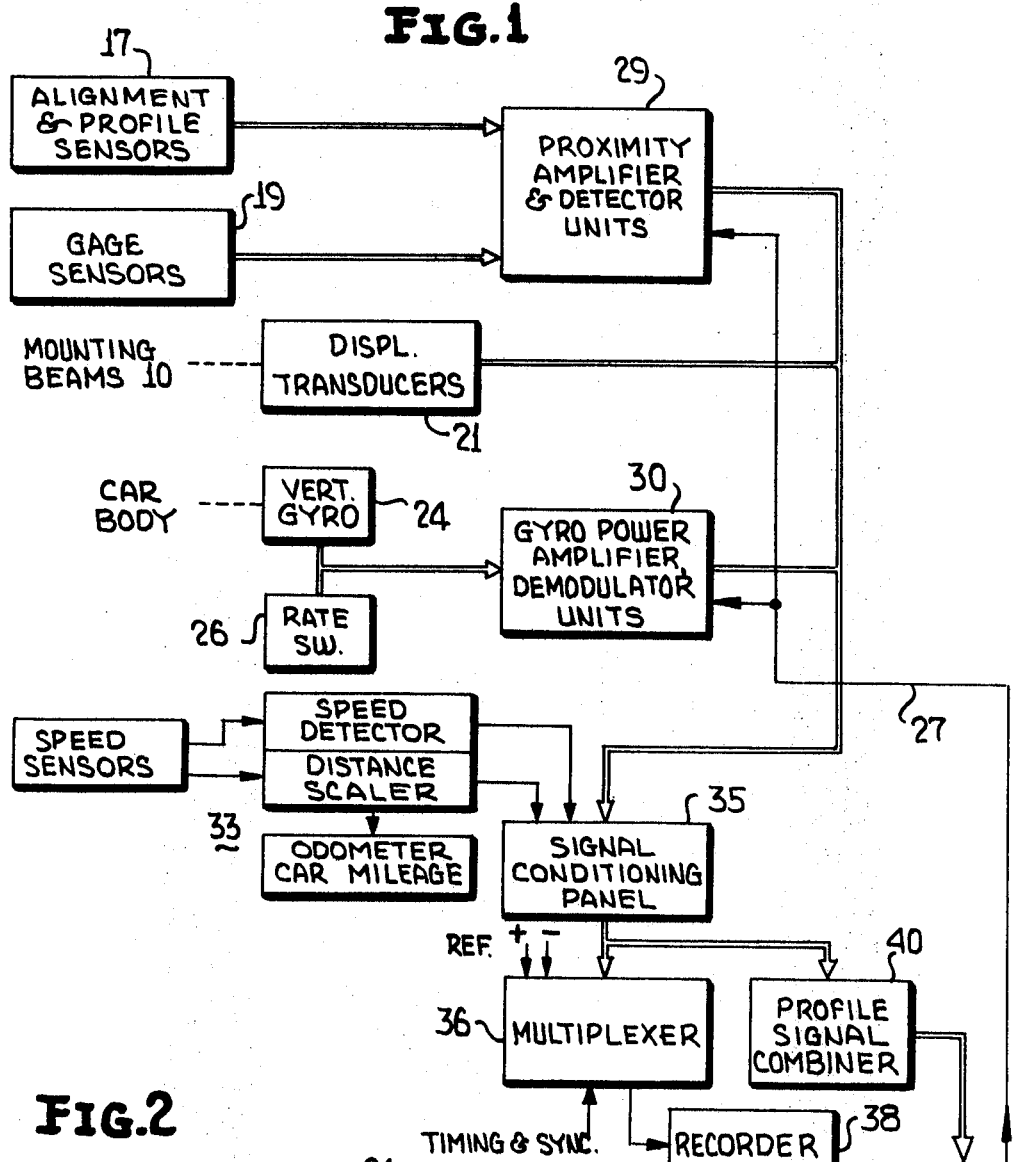
FIG. 1 is a block diagram of the instrumentation utilized to obtain track parameter measurements in accordance with the invention.
Figure 6:
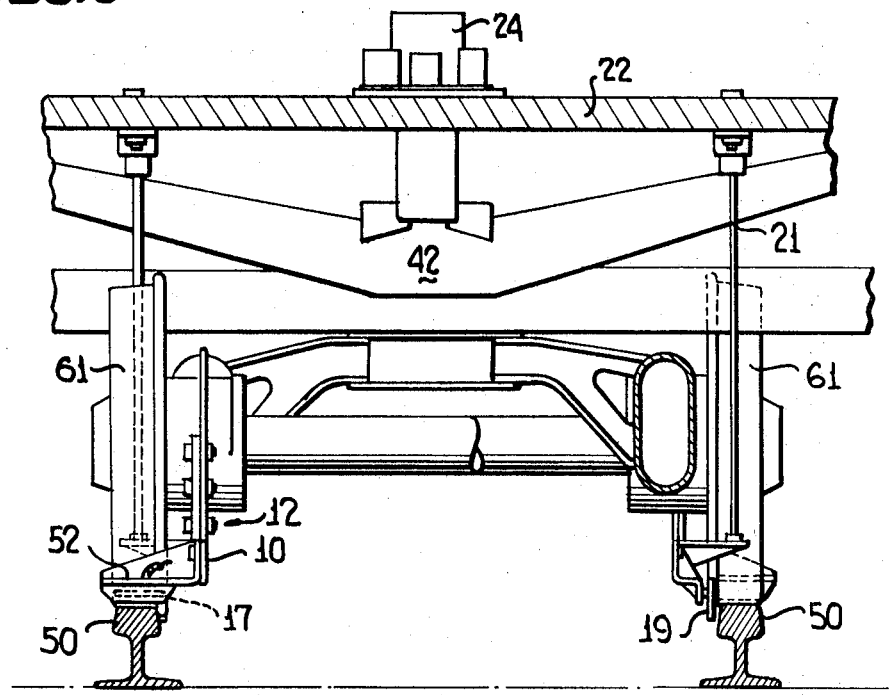
FIG. 6 is a fragmentary front view of the apparatus of FIGS. 4 and 5.

Referring now to the drawings, and in particular to FIG. 1, showing a block diagram of the instrumentation system, it will be observed that the ancillary instrumentation apparatus includes a pair of mounting beams 10 (see also FIGS. 4, 5, 6) which, in a constructed embodiment, were approximately fourteen feet in length. The mounting beams are secured by brackets, generally designated by reference numeral 12, to the running gear 15 (bogies, trucks, struts, or the like) of the car, for carrying a plurality of alignment and profile sensors or probes 17 and gage sensors or probes 19 in proximity to each rail of the track. The instrumentation equipment further includes a pair of displacement transducers 21 of any conventional type mounted between the floor 22 of the car and one or both mounting beams 10 (e.g., FIGS. 4 and 6), to determine relative displacements therebetween; a gyroscopic assembly 24, which includes a vertical gyro for establishing a plane of reference; means 27 for supplying electrical power to the various components; amplification and detection units 29, 20; speed, distance, mileage detection apparatus, generally designated by reference numeral 33; and may include further instrumentation such as load cells and strain gages (not shown) for measurement of vertical and/or lateral loads. Track profile (i.e., elevation or vertical curvature) signals are recorded on magnetic tape at a rate of approximately 250 samples per second, or 1.7 samples per foot of track at 100 m.p.h. train speed.

The signals obtained from the profile, alignment, and gage sensors 17, 19 are supplied to respective proximity amplifier and detector units 29, one such unit for each channel via which detected information is transmitted. The output of each proximity amplifier and detector unit is a DC voltage whose magnitude and polarity are indicative of instantaneous vertical and lateral displacements of the non-contacting probes or sensors from the rail, and hence of profile and alignment of the track and rails thereof when the data is subsequently analyzed. During a test run, however, the information obtained from the sensors, gyro, speed, distance, mileage detectors, etc., may be sampled and recorded on the several tracks of a standard magnetic tape for reproduction and analysis at a more convenient time. To this end, the DC output voltages deriving from the various amplifier and detector units and other processing components are fed to a signal conditioning panel 35. The function of the signal conditioning circuit is simply to adjust the magnitudes of the incoming signals relative to a specific reference voltage, strictly for recording purposes, and it may be of any conventional construction for that purpose. For example, the signal conditioner may comprise a plurality of operational amplifiers and/or scaling resistances for scaling the incoming signals to render them suitable for application to a particular recorder.

Inputs to the signal conditioning panel are also supplied from the conventional vertical gyro 24 and rate switch 26 mounted in the car body, via appropriate gyro power amplifier, and demodulator units. In addition, further signals are supplied to the signal conditioning panel from sensors 33 to provide speed and distance readings and to present an indication of mileage traveled during the course of the test run. Because of the large number of variables of information, up to 100 or more, to be recorded for subsequent analysis, and the relatively smaller number of available tape tracks (recorder channels), for example, seven, a multiplexer 36 is provided for sampling the variables and supplying the samples to the recorder 38 in a time-division sequence. The multiplexer may typically comprise a commutator in which a rotary armature moves sequentially in and out of contact with the various channel terminals to successively pick off signal therefrom, and may be fed timing and synchronizing information in conventional manner.

As previously indicated, the present invention provides an instrumentation system predicated on the use of rail proximity sensors such as non-contacting capacitive probes, for vertical and lateral curvature (mid-ordinate-to-chord) measurements and for gauge measurements. The non-contacting sensor arrangement is essential to achievement of a 150 m.p.h. or more measurement capability, for reasons discussed earlier.

In order to provide accurate, reliable data as to rail curvature, both vertical and lateral, and separation of or distance between rails (i.e., track gauge), it is desirable that the proximity sensors be widely spaced longitudinally along the track on a straight mounting beam 10 attached to the undercarriage or truck 42 (FIGS. 4, 5, 6) of the railway car in which the test and instrumentation equipment is assembled. The sensor mounting beam 10 is oriented in nominally parallel relationship with the longitudinal axis of the rail to which it is adjacent. The relationship is not truly parallel unless the rail, like the mounting beam, is completely straight in the sense of an absence of longitudinal curvature or distortion. By "widely spaced" proximity sensors is meant that those probes which are to provide measurements of the same track parameter are separated from one another along the beam 10 by a distance much greater than the distance between individual probe and rail.

If, for example, three proximity and alignment probes are provided along each mounting beam, as in the arrangement shown in the preferred embodiment, two sensors at or near the extremities of the beam and the third sensor at or near the center of the beam, it follows that if the rail is curved as a result of the character of the roadbed, or the geography of the surface or terrain in the immediate vicinity of the track, the sensors, lying along a straight beam, will be separated from the rail by different distances, though the difference may be slight. Preferably, the profile and alignment sensors are normally horizontally positioned relative to the track in the manner shown in FIG. 7. In this illustrative embodiment, each sensor or probe 17 comprises a pair of electrodes or plates 45, 46, each of which has a shield 47, 48, respectively, to prevent the picking up of stray capacitances from conductive elements other than the rail 50. Each sensor 17 is attached to mounting beam 10 via a bracket or arm 52. As will presently be described in greater detail, capacitance between the railhead and each plate depends in part upon vertical distance between the respective horizontally oriented plate and upper surface 53 of the railhead, and upon the extent of coverage of that upper rail surface by the plate area, i.e., the effective area of the capacitor plates. Since effective length of plate is invariant, i.e., each plate consistently presents a uniform length to the rail surface as the car moves along the track, any variation in area is directly attributable and proportional to the lateral shifting of the plate relative to the railhead, i.e., to the effective width of the plate. Accordingly, both vertical and lateral displacements may be determined from a nominally horizontal orientation of the rail proximity sensors, and it is for this reason that the terminology "proximity sensing" is intended to include normal and lateral (or offset) spacing between two elements. It will also be observed that one or both of the capacitive probes may be positioned alongside the rail, as is the gauge sensor, to obtain the desired information, and for this reason it is important to note that the measurements do not depend upon any particular orientation between probes and rail. In fact, the plates 45, 47 may be positioned approximately horizontally relative to the floor of the car but at an angle to the longitudinal axis of the rail within that horizontal plane.

While it is desirable to provide sensor mounting beams 10 which can act as chords (relative to the arc of the track) of 31 feet and 19.5 feet for alignment and profile (for dimensional compatibility with accepted standards), the underfloor constraints of the typical railroad car may not admit of a rigid instrumentation base of such length. Such was the case in a test car housing a working model of the present invention. Moreover, we have found that the flexibility of the car body further prevents that body, itself, from being employed as a base for alignment and profile sensor mounting. Since the length of instrument beams 10 under each truck 42 was restricted to 14 feet, for reasons of clearance with the Budd Company car used as a test car, the chord for the rail alignment and profile measurements has been selected to be of this value for purposes of describing the present embodiment. It is quite apparent, however, that the mid-ordinate-to-chord deflection versus baseline lengths for various rail curvatures may be obtained by a simple and conventional transposition between actual and standard baselines. It can be shown, for example, that 0.125 inch deflection referred to a 31 foot alignment standard baseline corresponds to a 30 minute curve, which in turn corresponds to a 0.030 inch deflection referred to a 14 foot instrument baseline.

Accordingly, the rail-to-base displacement must be less (i.e., is inversely proportional to the square of the baseline) in order to detect the same degree of lateral or vertical track curvature. We have found that alignment and profile instrumentation in accordance with this exemplary embodiment is capable of providing an accuracy of approximately 0.010 inch in mid-ordinate-to-chord deflection, corresponding to approximately 0.045 inch in 31 foot chord alignment and 0.020 inch in 10.4 foot chord profile.

Figure 2:
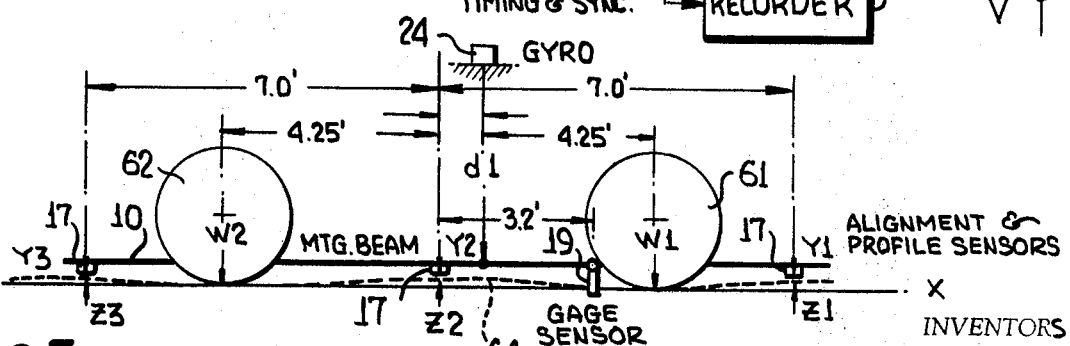
FIG. 2 is a simplified elevational view of a significant portion of the proximity sensing system showing dimensional relationship between sensors and mounting beam and floor and wheels of the test car.

As generally shown in FIGS. 2, 4, 5, and 6, the rail alignment and profile proximity sensors 17 are positioned at the mid-point and ends of each 14 foot rigid beam, the latter of which act as means providing a reference, datum line or baseline for the measurements. The sensors 17, of course, constitute the basic source of alignment and profile data. Each capacitive probe is, as previously stated, preferably in the form of a pair of shielded rectangular elements, i.e., plates, 45, 46 (FIG. 7) coupled to the beam 10 via a respective mounting bracket 52. Exemplary dimensions indicative of the positional relationships of the various elements are shown in FIG. 2. The center of beam 10 coincides with the point midway between the wheels 61, 62 on one side of the truck for the railway car. The centrally located profile sensor 17 is positioned at that point of the beam and the end sensors 17 are positioned approximately 7 feet to either side of that point, for the 14 foot mounting beam example. All dimensions are presented purely for the sake of example and are in no way intended as limitations on the scope or definition of the invention.

Figure 7:
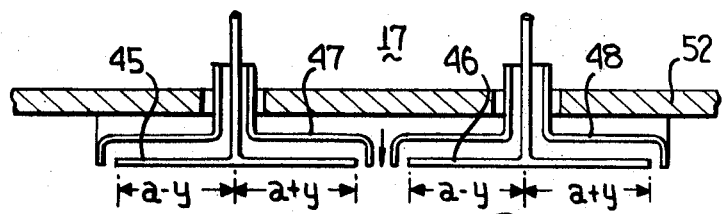
FIG. 7 is a detail view of the profile and alignment sensors relative to a rail section normal to the longitudinal axis of the track.

The dotted line designated by reference numerals 64 in FIG. 2 is an exaggerated indication of the rail profile in response to forces exerted vertically on the rail at the points of contact with the wheels, these forces, of course, produced by the weight of the car on the track. Accordingly, sensor 17 ahead of wheel 61 has a total capacitance relative to the railhead which depends upon the vertical separation distance designated Z1 and upon any lateral offset, designated Y1, owing to displacement of that sensor from its normal position relative to the rail head (see FIG. 7) as a result of the lateral rail curvature. Referring again to FIG. 7, if the capacitance of the right hand probe is designated $C_1$ and that of the left hand probe is $C_2$, then the value of these capacitances is given approximately by the expressions (1)
$$C_1 = K_1 \frac{a-y}{Z}, \quad C_2 = K_1 \frac{a+y}{Z}$$

where $$-a < y < a$$

where $K_1$ is a constant whose value is determined primarily by the permittivity of the air between rail and probe plate, and the remaining factors are dimensions defined in FIG. 7. These capacitances, which of course, vary with changes in distance or orientation along the Z and Y axes, can be measured directly and the desired track parameters then computed. Obviously, a common return line may be coupled between the rail and the instrumentation via the wheel of the car, although we have found that for "capacitance-to-ground" measurements a virtual return path exists without need for any special electrical connections to the rail. From a practical point of view, however, to obtain substantially instantaneous results which may be sampled and recorded for later analysis, it is desirable to provide means by which the capacitance or other variable electrical parameter may be measured indirectly by its effect on a continuous signal. For example, a circuit such as that shown in FIG. 9 may be utilized to provide a DC output voltage whose magnitude and polarity are dependent upon the probe to rail capacitance.

Figure 9:
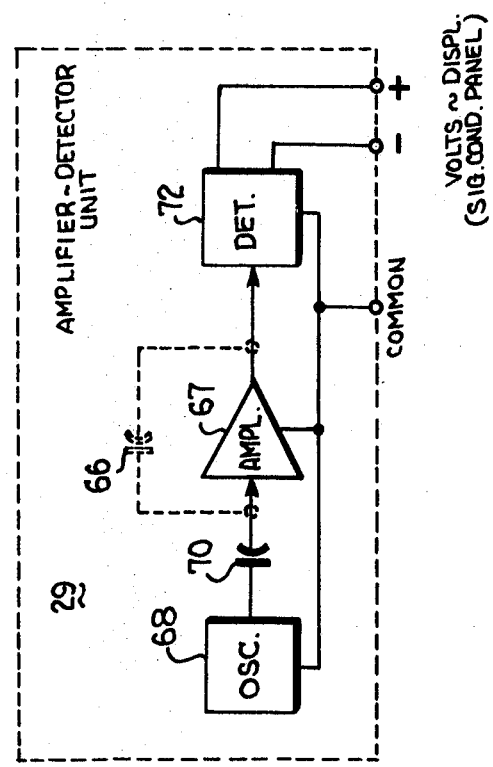
FIG. 9 is a schematic circuit diagram of a proximity sensor channel of the system of FIG. 1.

Referring to FIG. 9, each probe plate is coupled to a respective amplifier-detector unit 29 such that the probe-rail capacitance determines the effective capacitance 66 in the feedback path of an operational amplifier 67. Input signal for the amplifier is obtained from a relatively stable oscillator 68 generating a signal of constant amplitude at a frequency of say, nominally 50 kc./s. The output oscillations of the oscillator are applied to amplifier 67 via an input capacitor 70. The amplitude of the output signal of amplifier 67 depends upon the value of a number of constant factors (such as the gain of the amplifier and the value of the input capacitance) and primarily only a single variable, the probe-rail (feedback) capacitance. The output signal of the amplifier is rectified to provide a DC output voltage relative to a predetermined reference level (preferably that occurring when the probe is a specified nominal distance from the rail and is oriented as shown in FIG. 7) by a detector 72. The polarity of the DC output voltage then indicates the nature of the curvature of the track relative to the baseline and the magnitude of that voltage is representative of the magnitude or extent of the curvature.

If the constant factors determining the DC output voltage of amplifier-detector unit 29 are lumped in a single constant $K_2$, then referring back to expressions (1) the DC output voltages derived from the capacitances of the right hand and left hand probes of FIG. 7 are, respectively (2) $$V_1 = K_2 \frac{Z}{a-y}, V_2 = K_2 \frac{Z}{a+y}$$

i.e., the DC output voltage is inversely proportional to feedback capacitance. The voltage for each channel is scaled, sampled, and the samples recorded for analysis and plotting or calculating of track parameters at a more convenient time. Clearly, expressions (2), being a pair of simultaneous equations in two variables (Z and Y) are soluble for vertical and lateral displacements. Accuracy of data is enhanced where the Z and Y dimensions are restricted to the limits $0.125'' < Z < 1''$ and $-1.25'' < Y < 1.25''$, where Y is measured from the rail centerline.

There are several factors which, to some extent, affect the interpretation of alignment and profile data as sensed by the method under description. For one thing, the lateral deflections sensed are essentially rail-to-sensor displacements. Hence, the mid-ordinate-to-chord readings apply to the apparent rail, not to the inside face of the rail, or gage point. The profile sensors should not extend below the top of the rail because the lateral clearance required for a 14 foot baseline (mounting beam) is approximately ±1.0 inch in order to negotiate a 250 foot radius curve, exclusive of other tolerances. It is possible, however, to derive the alignment referenced to the inside face of the rail by combining the left and right profile sensor and gage sensor readings, a process which amounts to averaging the left and right rail alignment to obtain track alignment and attributing one-half the gage sensor reading to each rail.

Another factor affecting interpretation of data is the variation in contour of worn rail over the 14 foot mounting beam baseline, such variations tending to exaggerate deflections. However, a uniformly worn contour will effect all sensors equally, or approximately so, and will not, therefore, affect the computed alignment.

Another factor to be considered is that the computations required to process and correct sensor readings are not readily performed in the car, so that final track profile data will generally or usually result from computer processing after a run has been performed. It is desirable, however, to provide on-board chart records of alignment and profile of each rail obtained from linear sums and differences of raw data in a unit such as the track profile signal combiner 40 shown in relationship to the other instrumentation components in the block diagram of FIG. 1, and in greater detail in FIG. 10. These chart records are indicative of the true alignment and profile, for small deflections; but where relatively large simultaneous vertical and lateral deflections occur, such chart records are nonlinear.

Figure 3:
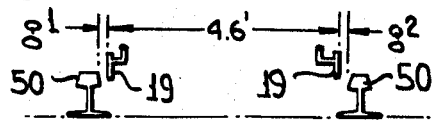
FIG. 3 is a simplified front view of the gauge sensing system.
Figure 8:
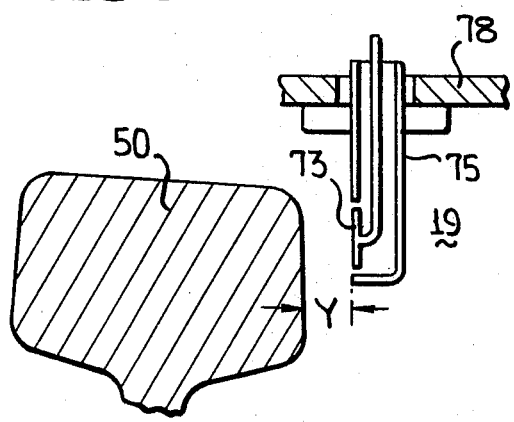
FIG. 8 is a view similar to that shown in FIG. 7, with respect to the gauge sensor.

A detail view of the gage sensor 19 relative to a cross-section of the rail 50 normal to the longitudinal axis of the track is shown in FIG. 8. Each gage sensor or probe 19 is mounted on the beam 10 to ride behind the wheel flanges of the front wheels (e.g., wheel 61, FIG. 4) of the car or test truck, relying on the wheels to clear away any obstructions which might otherwise cause damage to the gage sensors, such as pivotal projections encountered in the negotiation of switch points. For this reason the gage sensors are preferably mounted adjacent the inside surface of the rail. Specifically, the two gage sensors 19 are mounted to brackets directly opposite each other (FIGS. 3 and 6) at the mounting beams 10 on either side of each truck. The lateral spacing of the gage sensors is substantially maintained by the truck, the arrangement permitting some lateral play to avoid any stressing of the beams. The position of the capacitor plate 73 of each gage sensor 19 adjacent and parallel to the side surface of a respective rail 50 permits a capacitance measurement indicative of distance between capacitor plate and inner rail surface for gage sensors adjacent each rail, and thereby permits a computation of accuracy of gage (gauge) of the track from the recorded data.

Each gage sensor output is proportional to displacement from sensor to rail with a resolution of approximately ±0.020 inch. By summing the sensor readings one obtains the track gage with an RMS accuracy of ±0.030 inch. In the processing of the recorded data, the average of the gauge readings taken from both trucks or bogies of a car as they pass the same point on the track car provide an RMS accuracy of ±0.020 inch.

The gage sensor or probe may be coupled to an operational amplifier in the same manner as shown in FIG. 9. As in the instance of the profile and alignment sensors, however, any conventional arrangement for direct or indirect measurement of capacitance may be used, as desired.

Cross-level measurements may also be obtained at least partly through use of rail proximity sensors of the type thus far discussed. To measure absolute cross-level, a vertical reference is required and this is obtainable from a self-erecting vertical gyro, which may be of any suitable commercially available type such as Kearfott C070 f101 25. Such a package includes power supply, erection cut-out sensors, demodulator and cables (including unit 30, FIG. 1). One inch in cross-level corresponds to approximately one degree in angle, and hence to measure cross-level to ±.1 inch an accuracy of about ±6 minutes of arc is required. The pitch erection is disabled during the longitudinal acceleration and deceleration, whereas roll erection is disabled during lateral acceleration, (e.g., on curves) by use of a conventional rate switch 24 (FIG. 1). The gyro pitch and roll gimbal pick-offs provide signal continuously indicating the angles of the gyro axis and the mounting base as reference measurements. Preferably the gyro apparatus is mounted on the car body floor 22 (FIGS. 4 and 5) near the car bolsters, and vertical displacements are measured to the mounting beam on each side. The cross-level reading is then the sum of gyro roll, difference in car-to-mounting beam displacements on each side, and difference in vertical components of profile sensor-to-mounting beam displacements on each side.

Figure 10:
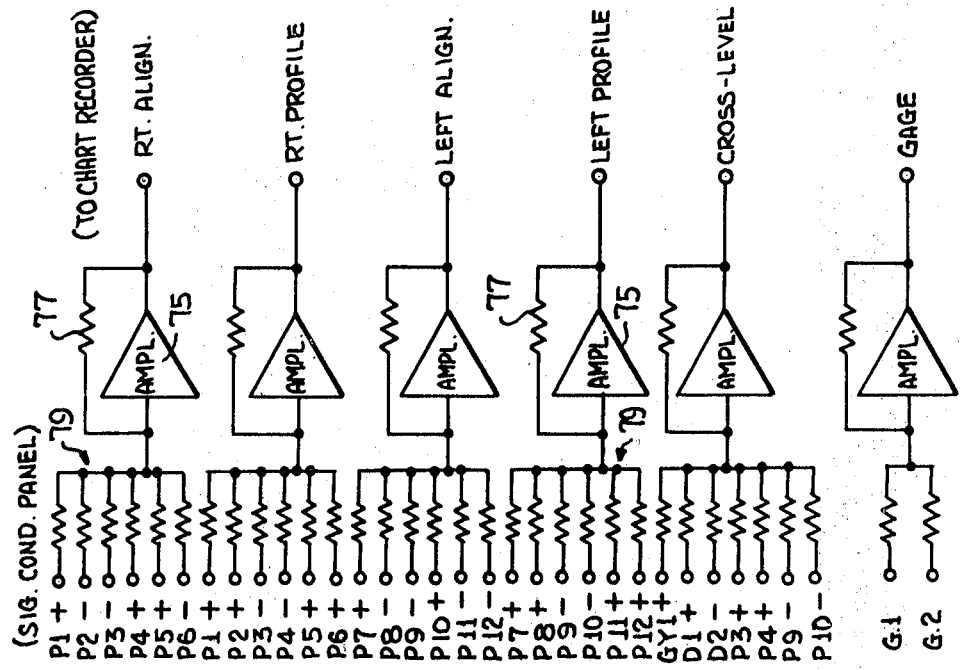
FIG. 10 is a schematic circuit diagram of a profile signal combiner suitable for use in the system of FIG. 1.

A schematic diagram of the profile signal combiner 40 shown in the block diagram of the FIG. 1 is illustrated in greater detail in FIG. 10. The signal combiner is employed to sum the various pieces of raw data, as previously mentioned, and to derive the track profile parameters for recording on a chart recorder. To this end, combiner 40 comprises a plurality of summing operational amplifiers 75 with feedback resistors 77 and several input resistors 79 having values selected in a known manner, for each track parameter desired.

For example, to obtain a reading and recording of the right profile parameter of the track (i.e., vertical curvature of right rail), a scaled summation is taken of the outputs obtained from the capacitance values of the profile and alignment probes mounted on the beam on the right side of the truck. The summation is, as shown in FIG. 10, $$P_1+P_2-(2P_3+2P_4)+P_5+P_6 = \text{right profile}$$

where adjacent probes at one end of the right hand mounting beam are designated $P_1$ and $P_2$, at the midpoint of the beam, $P_3$ and $P_4$, and at the other end of the beam, $P_5$ and $P_6$. In order to provide the factor 2 in the $P_3$ and $P_4$ signal summation, it is only necessary to halve the resistances 79 in the leads coupling those two incoming DC signals to the operational amplifier 75 as compared to the resistance values in the other leads. The factors $P_7$ through $P_{12}$ designate probes 17 on the beam for the other side of the truck. Similarly, $G_1$ and $G_2$ refer to the outputs of the gage sensors 19, and GY to the gyro output.

Four displacement transducers 21 are preferred for measuring the roll angle of the car with respect to the plane of the mounting beams in order to refer the gyro roll readings to cross-level. The displacements should be parallel to each other in order to avoid geometrical errors. Displacement signals $D_1$ and $D_2$ in FIG. 10 are obtained from transducers 21 at either side of the truck.

Finally, the measurement of distance traveled may be taken from the speed sensors on the motors themselves. The speed sensor signal is preferably employed to develop a cycles-per-unit-distance signal which can be recorded. In effect the revolutions of the driven wheels are used to measure distance traveled, whereas absolute distance can be obtained by the use of recorded events at mile posts, or other reference points, to correct any accumulated errors.

Wheel wear changes the wheel diameter, but over a period of time the change in cycles-per-unit-distance versus mileage can be obtained and employed to correct the distance scale factor utilized in data processing. The effect of wheel bounce and slip at high speed introduces a speed-dependent error. However, the change in distance scale factor (feet per cycle) as a function of speed can be derived from the test track data and included in the computer data reduction. The effect of wheel tread taper and gage can also be accounted for by correcting the distance scale factor as a function of measured gage, if necessary. However, as a general rule this correction will be very small.

Specific details of the undercarriage or trucks or bogies of each car have been omitted from the drawings where the various parts are not essential to an understanding of the invention, and where desirable from the standpoint of clarity to prevent unnecessary cluttering of the views. As previously stated, the rail proximity sensors or probes need not be of the capacitive type shown here so long as they are positionable in non-contacting relationship with the rails. For example, inductive probes (e.g., solenoids) may be employed to generate a magnetic field of uniform known character in the absence of conductive members in the immediate vicinity of each probe. The magnetic field is altered, however, when the probe is placed adjacent a rail, and the extent of the alteration or distortion of the field depends upon proximity to the rail, and can be detected. Alternatively, microwaves, pneumatic arrangements, or ultrasonics may be employed for rail proximity sensor operation, and are contemplated within the terminology "sensing means."

We claim:

1. Apparatus for use on a railway vehicle having a car body and an undercarriage for transporting said body along the rails of a railway track, said apparatus for determining the surface contour and other parameters of said track, said apparatus comprising:

means for establishing a rigid baseline relative to at least one of said rails, sensing means mounted on said baseline-establishing means, means connecting said baseline-establishing means to said undercarriage for orienting said baseline-establishing means longitudinally relative to said one rail with said sensing means arranged to undergo variable spacing relative to said one rail during movement of said vehicle along said track, and for continuously maintaining said sensing means in non-contacting relationship with said one rail throughout said movement, means electrically energizing said sensing means in electrical circuit relationship with said one rail to produce a reactive impedance therebetween which varies with the variation in spacing between said sensing means and said one rail during said movement of said vehicle, means responsive to variations in said reactive impedance for detecting the proximity of said one rail to said baseline, and means for recording a pattern of the proximity of said rail to said baseline at a plurality of points along said track to provide an indication of the contour of said rail relative to said baseline under the dynamic conditions established by said vehicle movement along said track.

2. The invention according to claim 1 wherein said baseline-establishing means is a rigid beam mounted by said connecting means to said undercarriage in an orientation nominally parallel to the longitudinal axis of said track, said beam having a length for exceeding the spacing between said sensing means and said one rail, to constitute the chord of an arc formed by any curvature of said one rail; and wherein said sensing means includes a plurality of electrical probes mounted at intervals along said beam to designate the nature of said arc relative to corresponding points along said chord.

3. The invention according to claim 2 wherein said probes are capacitive probes.

4. The invention according to claim 3 wherein each of said capacitive probes comprises a conductive plate mounted on said beam generally parallel to the upper surface of the railhead for longitudinal movement in proximity to the rail, and for lateral shifting relative to the rail when the beam deviates from parallelism with the rail as a consequence of curvature of the rail, the capacitance of each said plate relative to the railhead depending upon separation of the respective plate from the railhead in a direction normal to the longitudinal axis of the rail and in the plane of the rail, and upon lateral position relative to said railhead.

5. The invention according to claim 4 wherein is provided at least three pairs of said electrodes mounted to said beam, one pair mounted at substantially the midpoint and two pairs mounted at the ends of said beam, said electrodes comprising plates oriented parallel to the upper surface of the railhead relative to the bed of said track.

6. The invention according to claim 5 wherein is provided another beam corresponding to the first-named beam and having probes corresponding to the first-named probes mounted at said intervals thereon, said another beam mounted to the undercarriage of said vehicle in an orientation nominally parallel to the longitudinal axis of said track to position the probes thereon adjacent the other of said rails.

7. The invention according to claim 6 wherein is further included a pair of additional capacitive probes, one mounted on said first-named beam and the other mounted on said another beam, in non-contacting relationship with respective opposing inner surfaces of the rails of said track, to detect deviations in the gauge of said track.

8. The invention according to claim 7 wherein each of said pair of additional capacitive probes is mounted on a respective one of said beams at a position immediately behind a respective wheel of said vehicle, relative to the normal forward direction of movement of said vehicle, for protection against damage by obstructions along the track.

9. The invention according to claim 3 further including means generating a substantially continuous signal and responsive to the capacitance of respective probes relative to said rail for altering the magnitude of said signal in accordance with changes in said capacitance, said means for recording comprising means for storing representations of said signal.

10. The invention according to claim 3 including further capacitive probes coupled to said undercarriage adjacent both rails of said track for detecting deviations in the gauge of said track.

11. Apparatus for use on a railway vehicle having a car body and an undercarriage for transporting said body along the rails of a railway track, comprising:
- a mounting beam,
- a plurality of proximity sensing means mounted at spaced-apart positions along said mounting beam, each of said sensing means effective, when energized, to establish a respective force field,
- means coupling said mounting beam to said undercarriage for longitudinal orientation relative to a rail of said track and nominally parallel to said rail, and for maintaining said plurality of sensing means spaced from said rail while said sensing means experience variations in spacing and orientation relative to said rail as a consequence of the weight and movement of said vehicle on said track,
- means coupled to said sensing means for electrical energization thereof to establish said respective force fields at said positions of said sensing means in the immediate vicinity of said rail, and
- further means coupled to said sensing means for detecting changes in said respective force fields, from a reference field established with a predetermined spacing and orientation between said baseline and said rail, as a function of variations in spacing and orientation of each said sensing means relative to said rail, for determining track profile and alignment, as said vehicle moves along said track.

12. A high speed track profile measuring system for use on railway vehicles, comprising:
- a rigid beam mounted on said vehicle for orientation nominally parallel to a rail of the track on which said vehicle moves, to establish a baseline relative to said rail, said beam mounted to maintain a non-contacting relationship with said rail irrespective of variations in spacing relative to said rail resulting from variations in track contour as said vehicle undergoes high speed movement along said track,
- a plurality of capacitor plates mounted on said beam at spaced-apart positions therealong and nominally parallel to the upper surface of said rail, for non-contacting relationship with said rail,
- means coupled to said capacitor plates for establishing a potential difference between each plate and said rail, and
- means further coupled to said capacitor plates for detecting variations in capacitance relative to said rail in response to variations in spacing of said plates relative to said rail as said vehicle undergoes high speed movement along said track, whereby to detect the profile of said rail relative to said baseline.

References Cited

UNITED STATES PATENTS

| | | | |
|---|---|---|---|
| 2,011,425 | 8/1935 | Sperry et al. | 324—37 |
| 2,231,035 | 2/1941 | Stevens et al. | 324—61 |
| 2,417,062 | 3/1947 | Coake | 324—61 X |
| 2,859,528 | 11/1958 | Grossmann | 33—144 |
| 2,971,154 | 2/1961 | Lerner | 324—61 |
| 3,364,579 | 1/1968 | Fisher | 33—145 X |

FOREIGN PATENTS 654,908  1/1938  Germany.

EDWARD E. KUBASIEWICZ, Primary Examiner

U.S. Cl. X.R.

33—144

Dedication 3,517,307.—*James Wallen, Jr.,* Annandale, and *Richard H. Hronik,* Falls Church, Va. TRACK PROFILE AND GAUGE MEASURING SYSTEM. Patent dated June 23, 1970. Dedication filed Mar. 8, 1973, by the assignee, *Melpar, Inc.*

Hereby dedicates to the Public the remaining term of said patent.

[*Official Gazette October 23, 1973.*]